United States Patent
Illsley et al.

(10) Patent No.: US 9,796,486 B1
(45) Date of Patent: Oct. 24, 2017

(54) INTEGRATED PROPULSION AND PRIMARY STRUCTURE MODULE FOR MICROSATELLITES

(71) Applicant: Planetary Resources Development Corp., Bellevue, WA (US)

(72) Inventors: Peter Illsley, Sammamish, WA (US); Hannah Goldberg, Seattle, WA (US); Spencer Anunsen, Shoreline, WA (US); Chris Voorhees, Bellevue, WA (US)

(73) Assignee: Planetary Resources Development Corp., Redmond, WA (US)

( * ) Notice: Subject to any disclaimer, the term of this patent is extended or adjusted under 35 U.S.C. 154(b) by 100 days.

(21) Appl. No.: 14/218,525

(22) Filed: Mar. 18, 2014

Related U.S. Application Data (60) Provisional application No. 61/798,739, filed on Mar. 15, 2013.

(51) Int. Cl.
  *B64G 1/40* (2006.01)
  *B64G 1/26* (2006.01)

(52) U.S. Cl.
  CPC ............... *B64G 1/26* (2013.01); *B64G 1/40* (2013.01)

(58) Field of Classification Search
  CPC .................................. B64G 1/26; B64G 1/40
  See application file for complete search history.

(56) References Cited

U.S. PATENT DOCUMENTS

| | | | | |
|---|---|---|---|---|
| 8,967,545 | B2* | 3/2015 | Manzoni | B64G 1/1021 244/158.1 |
| 2011/0240801 | A1* | 10/2011 | Manzoni | B64G 1/1021 244/171.1 |
| 2015/0121843 | A1* | 5/2015 | Anflo | F23R 3/30 60/218 |
| 2015/0128563 | A1* | 5/2015 | Anflo | F23R 3/30 60/260 |
| 2015/0217875 | A1* | 8/2015 | Manzoni | B64G 1/1021 244/171.1 |

OTHER PUBLICATIONS

Skrobot, et al., "ELaNa—Educational Launch Nanosatellite: Providing Routine RideShare Opportunities," 26th AIAA/US Conference on Small Satellites, Logan UT, Aug. 2012, SSC12-V-5.

Mueller, et al., "Micro-Inspector Spacecraft Testbed: Breadboard Subsystem Demonstrations," 2007 Space Technology Applications and International Forum, Albuquerque, NM, Feb. 2007, pp. 742-759.

Goldberg, et al., "Micro-Inspector Spacecraft: An Overview," AIAA-USU 20th Conference on Small Satellites, Logan UT, 2006, pp. 1-9.

\* cited by examiner

*Primary Examiner* — Timothy D Collins
*Assistant Examiner* — Jessica Wong
(74) *Attorney, Agent, or Firm* — Venable LLP; Steven J. Schwarz (57) ABSTRACT

A modular device for a spacecraft includes a propulsion system having a tank, a plenum, and a manifold, wherein the propulsion system is integrally formed with a structural frame of the spacecraft. A method of manufacturing the modular device is also discussed, the method including utilizing an additive manufacturing process to construct the propulsion system.

13 Claims, 12 Drawing Sheets

INTEGRATED PROPULSION AND PRIMARY STRUCTURE MODULE FOR MICROSATELLITES

CROSS-REFERENCE TO RELATED APPLICATIONS

This application claims priority under 35 U.S.C. Section 119 to U.S. Provisional Application No. 61/798,739, filed on Mar. 15, 2013, the entire content of which is incorporated herein by reference. This application also relates to U.S. application Ser. No. 13/869,643, filed on Apr. 24, 2013, the entire content of which is incorporated herein by reference.

BACKGROUND

In just a matter of years, the CubeSat platform has evolved from a low-cost experimental platform for the academic community into an industry-accepted standard with a robust community of industry, military, and scientific applications. In light of the continuing budgetary pressures for civilian and military space programs, CubeSats, and nanosatellites in general, provide an increasingly appealing and expeditious alternative to traditional spacecraft developments. In addition, the adoption of this platform has resulted in an expanding industry providing commercial off the shelf (COTS) components and subsystems specifically for CubeSat applications, including avionics, attitude determination and control, and power generation and storage. One area that remains under active development is enabling low-cost micro-propulsion systems for CubeSat-scale spacecraft. Without propulsion, CubeSat missions are resigned to a limited scope due to lack of maneuverability and station-keeping capability, and are rarely even considered for missions requiring significant (100s to 1000s of m/s) Delta V. Innovations in electric propulsion are of note but require significant power resources and a mission of sufficient duration to take advantage of low-thrust trajectories.

Presently, the commercial, government, and academic communities are developing systems to meet the needs of mission designers. The commercial aerospace industry has, in the past decade, moved to miniaturize propulsion technology for the CubeSat platform. Advancements are also occurring in the civilian government, military, and academic communities. For example, in 2005-2006, JPL created a multi-functional tank (MFT) for the Micro-Inspector spacecraft. The Micro-Inspector was a 10 kg spacecraft with a vaporizing butane propulsion system. The MFT contained a central butane liquid propellant tank, surrounded by a plenum, into which the butane was allowed to expand and vaporize completely. The low tank pressure (less than 100 psi even in worst temperature cases) allowed for a flat tank geometry except for slightly curved internal tank surfaces to facilitate the desired maximum tank pressure. The flat surfaces provided interfaces for avionics board mounting to provide the heat of vaporization to the butane propellant and in turn allowing for cooling of the avionics. From the plenum tank, eight thrusters were fed to produce attitude control and small delta-v for Micro-Inspector (only 15 m/s).

Despite some advancement in micro-propulsion systems, existing systems still consume a significant amount of the mass, volumetric, and financial resources.

SUMMARY

According to an embodiment, provided is a modular device for a spacecraft comprising: a propulsion system including a tank, a plenum, and a manifold, wherein the propulsion system is integrally formed with a structural frame of the spacecraft. According to another embodiment, provided is a method of manufacturing the modular device, the method comprising: utilizing an additive manufacturing process to construct the propulsion system.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. A person skilled in the relevant art will recognize that other components and configurations can be used without departing from the spirit and scope of the invention. According to embodiments, the invention provides an integrated propulsion and primary structure module (IPPSM) for microsatellites, and related methods. According to embodiments, IPPSM can be used by microsatellite developers as an "off the shelf" propulsion integration structure. Embodiments of the IPPSM and related methodology allow microsatellite developers to integrate propulsion, primary spacecraft structure, and launch interface into a common unit, thereby reducing cost, mass and volume. Embodiments can use additive manufacturing processes to create a simplified, modular, and multi-functional propulsion subsystem.

Embodiments of the IPPSM can serve as a spacecraft's structural backbone, as well as a launch interface and a universal payload interface. This can provide significant benefits, including, without limitation: providing cold-gas propellant options for both attitude control and station keeping; cost reduction from use of high-reliability, high-cycle, non-aerospace COTS components; simplification of design and integration through additive manufacturing; capability to perform more sophisticated missions on CubeSat platforms; and enhancements in spacecraft mass, volume, performance, and mission flexibility.

Figure 1A:
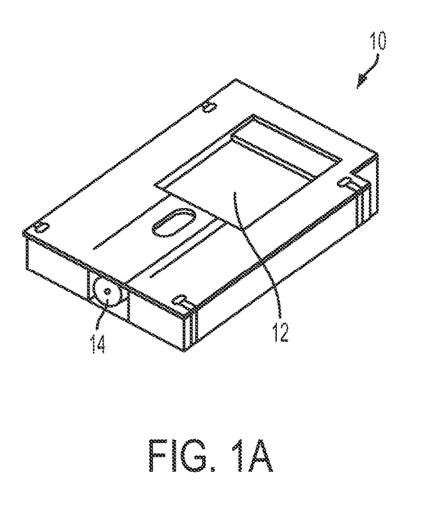
FIG. 1A depicts a bottom-side perspective view of an embodiment of an integrated propulsion and primary structure module (IPPSM) according to the present invention.
Figure 1B:
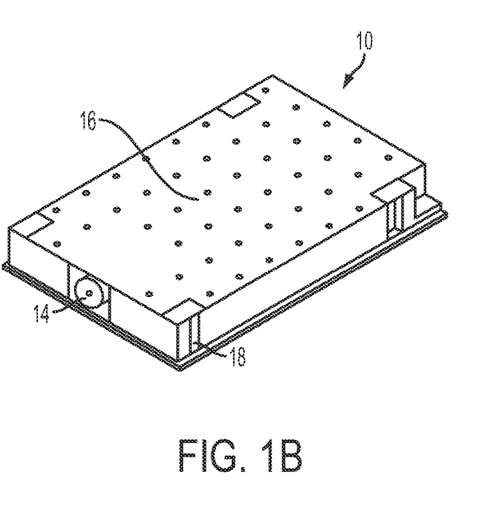
FIG. 1B depicts a top-side perspective view of the IPPSM of FIG. 1A.

FIG. 1A depicts a bottom-side perspective view of an embodiment of an integrated propulsion and primary structure module (IPPSM) according to the present invention. FIG. 1B depicts a top-side perspective view of the IPPSM of FIG. 1A. As shown, the IPPSM 10 can integrate the propulsion system's tank, plenum, and manifold geometries directly into the spacecraft's primary structural strongback. This integration of geometries into, for example, an Al 6061-T6 structure can be enabled by utilization of an additive manufacturing process, such as the direct metal laser sintering (DMLS) fabrication technique. By employing an additive manufacturing process for the component, geometries that would have normally existed as separate components, each requiring interface features, can now be included in a single manufactured element. This can result in a structure within which one or more—or all—features serve a dual purpose, e.g., as a critical geometry of a propulsion system and also as a load-carrying element of the spacecraft's structure.

Still referring to FIGS. 1A and 1B, embodiments of the IPPSM 10 can include embedded prop electronics 12, a maneuvering thruster 14, such as a resistojet maneuvering thruster, a payload interface 16, and an RCS microthruster module 18. As discussed above, these elements can all be included into a single manufactured element.

Embodiments of the IPPSM can range from approximately 25 mm tall to approximately 500 mm tall. The embodiment of IPPSM 10 shown in FIGS. 1A and 1B is approximately 50 mm tall, and contains an integral tank volume of approximately 2060 cm$^3$. An alternative embodiment (not shown) can have be approximately 100 mm tall, resulting in a considerably expanded tank volume of nearly 4700 cm$^3$. According to an embodiment, the baseline propellant can be ammonia ($NH_3$) with a nominal operating pressure at 20° C. of about 900 kPa, although embodiments of the IPPSM can be compatible with a variety of propellant options depending on the end user's requirements.

TABLE 1

Performance Summary for IPPSM

| IPPSM - 50 mm tall | units | value | IPPSM - 100 mm tall | units | value |
|---|---|---|---|---|---|
| Total Mass | kg | 3.5 | Total Mass | Kg | 5.5 |
| Propellant Mass | kg | 1.3 | Propellant Mass | Kg | 2.9 |
| Total Impulse | N * s | 2048 | Total Impulse | N * s | 4660 |
| System Effective Isp | s | 59.5 | System Effective Isp | s | 86.5 |
| Unloaded System Delta-V | m/s | 640 | Unloaded System Delta-V | m/s | 1060 |
| 6 kg Payload Delta-V | m/s | 205 | 6 kg Payload Delta-V | m/s | 415 |

Figure 2:
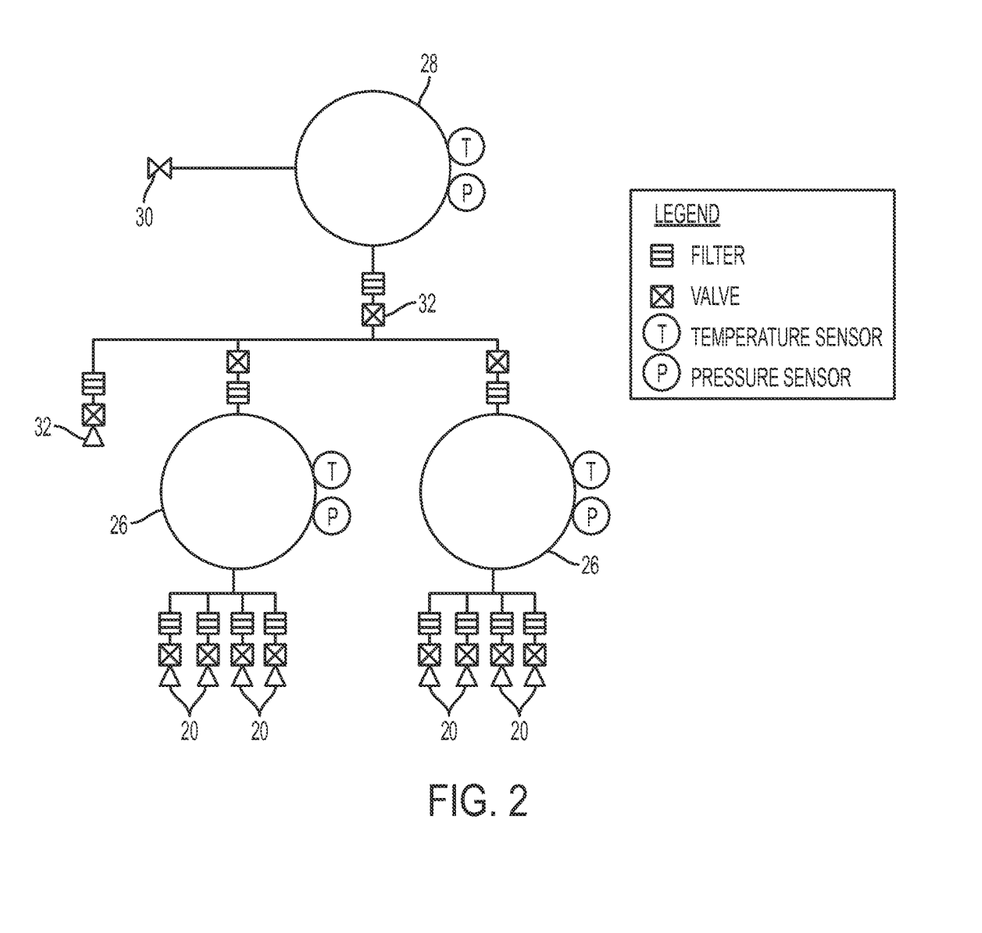
FIG. 2 depicts an example propulsion schematic for the IPPSM of FIGS. 1A and 1B.
Figure 3A:
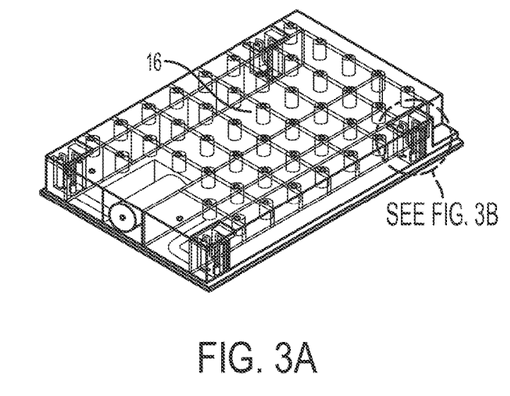
FIG. 3A depicts an embodiment of the primary structure of the IPPSM of FIGS. 1A and 1B.
Figure 3B:
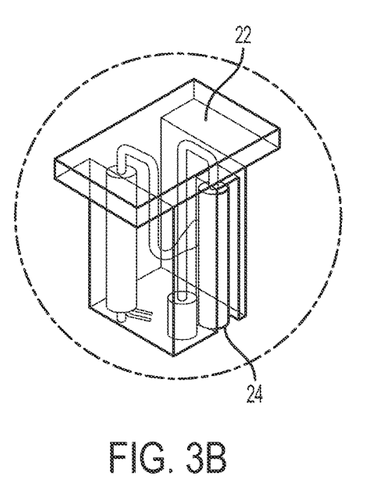
FIG. 3B depicts an embodiment of the microthruster module structure of the IPPSM of FIGS. 1A and 1B.

FIG. 2 depicts an example propulsion schematic for the IPPSM of FIGS. 1A and 1B. FIG. 3A depicts an embodiment of the primary structure of the IPPSM of FIGS. 1A and 1B. FIG. 3B depicts an embodiment of the microthruster module structure of the IPPSM of FIGS. 1A and 1B. According to embodiments, the IPPSM 10 can include a plurality of control system (RCS) thrusters 20, located at the corners of the assembly. For example, the IPPSM 10 can include eight thrusters 20 as shown in FIG. 2, however, other numbers are possible. As shown in FIGS. 3A and 3B, the thrusters 20 can integrate in modules 22 of two valve/thruster nozzle combinations 24, that can seal to the structural strongback 16 upon installation. As shown in FIG. 2, the IPPSM 10 can also include vapor plenums 26 corresponding to groups of the thrusters 20. The module can also include a liquid propellant tank 28 connected to a fill line 30, as shown.

According to embodiments, the IPPSM 10 can utilize COTS micro-dispensing solenoid valves 32.

These valves 32 can be used to service plenum volume and system cutoff. According to embodiments, the IPPSM 10 shown can provide up to six degrees of freedom control authority to the end user. Each RCS thruster unit 20 can have an estimated thrust level of around 10 mNm, and an effective impulse bit of 40 µNs, sufficient for fine control of a 6-12 U CubeSat in the 10-20 kg mass range. In order to provide phasing, plane change, and/or station-keeping activities, the IPPSM 10 can further include a resistojet maneuvering thruster (RMT) 32, e.g., at the aft end of the module. At 50-mNm total thrust, the thruster 32 can give a small satellite the ability to perform significant orbital modification. According to embodiments, the thruster 32 can be integrated into the IPPSM platform.

According to embodiments, the power and control required for the IPPSM can come from a built-in propulsion control electronics (PCE) unit, which may reside within a volume on the underside of the module 10. According to embodiments, the PCE can provide all or substantially all power switching required to operate the module's solenoid thruster valves 20 as well as the power required for operation of RMT 32. Additionally, embodiments of the PCE can have an onboard energy storage capability of about 10 W-hr by means of an integrated lithium polymer battery module. By providing this capacity, the end user's energy storage and power switching requirements can be independent from the needs of the propulsion system. Accordingly, the end user can have a single electrical interface for connection to its power bus and data communications via standard protocols, for example, such as the I2C protocol.

Embodiments of the IPPSM provide a launch vehicle interface compliant with a variety of commercially available containerized satellite deployers, such as, for example, the Containerized Satellite Deployer (CSD) 6 U and 12 U CubeSat deployment systems, available from Planetary Systems Corporation of Silver Spring, Md. For the end user, the IPPSM can provide a flat, strong, and mechanically stiff interface free of configurational encumbrance and ready for accommodation of spacecraft subsystem and payload hardware. Embodiments of the IPPSM can allow the module height to be easily altered to allow the end user to actively trade between propellant volume and available payload space.

Figure 4:
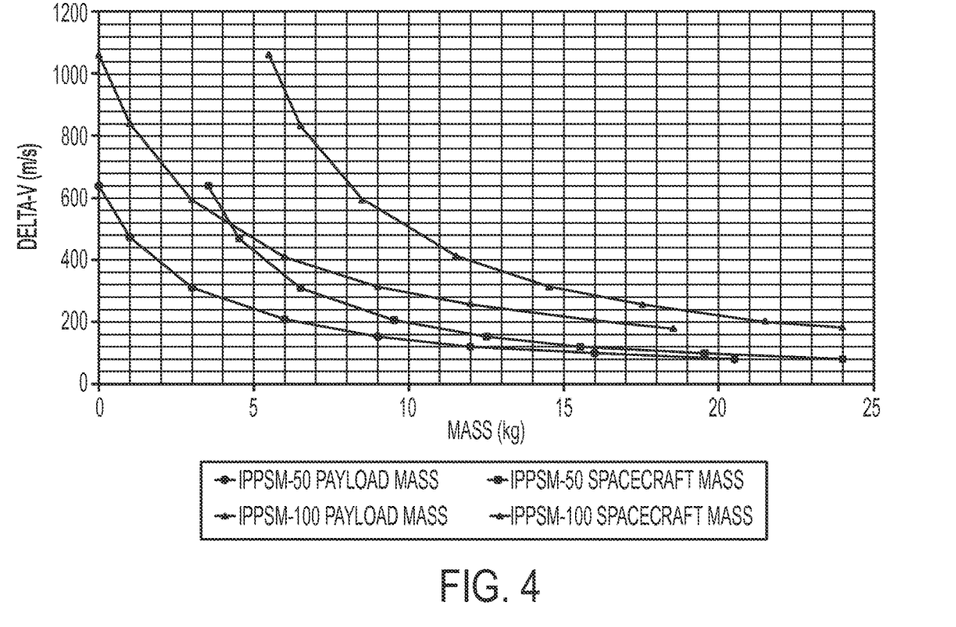
FIG. 4 depicts an example delta-V performance chart for the IPPSM of FIGS. 1A and 1B.

FIG. 4 shows the expected delta-V performance as a function of payload mass for exemplary embodiments of 50 mm tall and 100 mm tall IPPSM, assuming an $NH_3$ propellant stored at 20° C. As can be seen from the figure, embodiments of the module provide significant delta-V within a small, integrated package. For reference, a fully populated 6 U (6 kg) spacecraft utilizing an IPPSM with 100 mm height could expect a total system delta-V capability of over 415 m/s.

Figure 5:
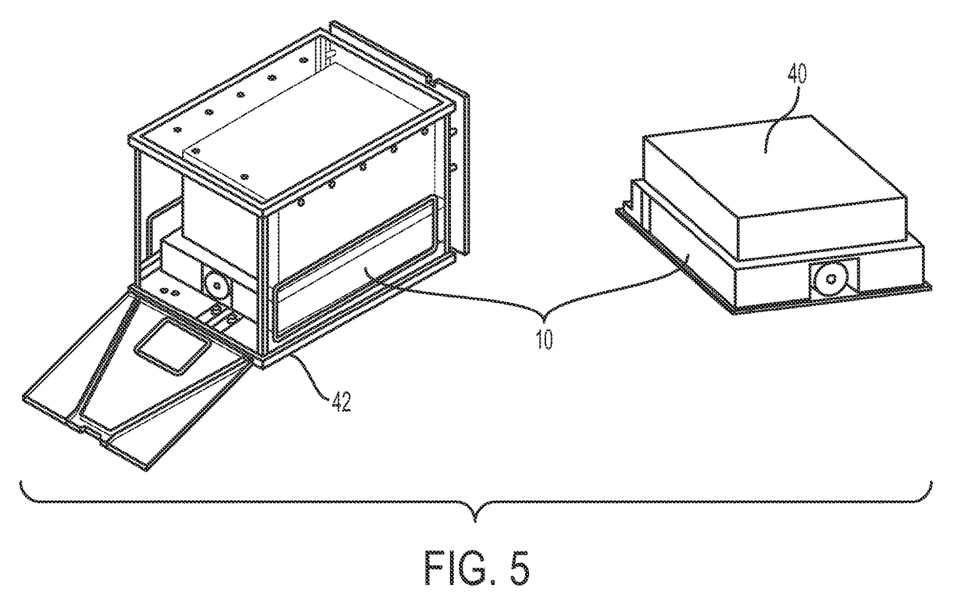
FIG. 5 depicts an embodiment of the IPPSM in different launch configurations.

The ease of module propellant capacity and clean physical interface makes the IPPSM attractive for a variety of small spacecraft payloads within the 6 and 12 U size regime. FIG. 5 depicts example configuration alternatives for the IPPSM, including applications in both the 6 U and 12 U launch configurations. The right-hand side of FIG. 5 depicts a 6 U configuration of the IPPSM 10. Reference 40 indicates the payload volume. The left-hand side of FIG. 5 depicts a 12 U configuration of the IPPSM 10 docked inside a CSD 42.

Figure 7A:
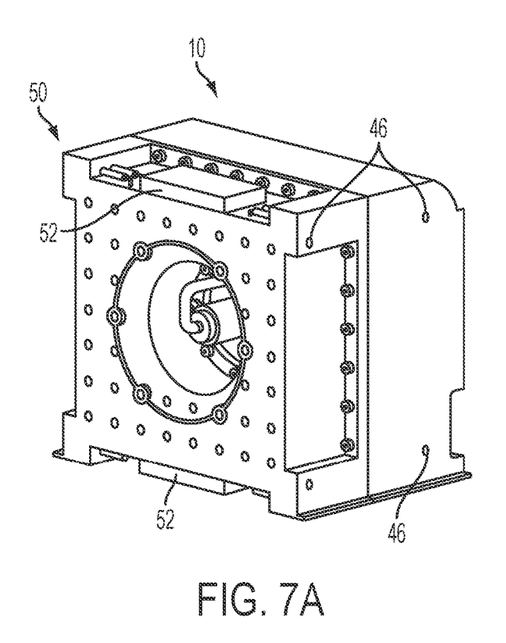
FIG. 7A depicts a front-side perspective view of another embodiment of an IPPSM according to the present invention.
Figure 7B:
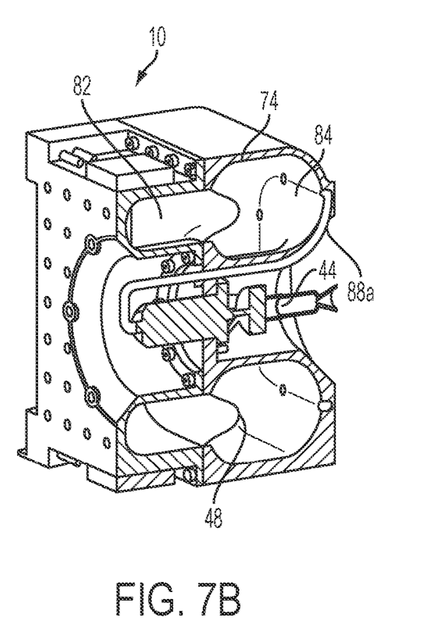
FIG. 7B depicts a cross-sectional view of the IPPSM of FIG. 7A.

FIGS. 7A and 7B depict an alternative embodiment of the IPPSM 10. FIG. 7B is a cross-sectional view of FIG. 7A. According to the embodiment of FIGS. 7A and 7B, the module 10 integrates a iN High Performance Green Propulsion (HPGP) monopropellant rocket engine assembly 44 along with a plurality of ammonia (NH3) cold gas Reaction Control System (RCS) thrusters 46. According to the embodiment shown, the IPPSM 10 can have eight of the RCS thrusters 46, however, other quantities are possible. The IPPSM can also include storage for both propellants. A portion of the tank 74 depicted as volume 84 can be dedicated to HPGP monopropellant while a portion of the tank 74 depicted as volume 82 can be dedicated to ammonia saturated liquid. Pressurant and propellant management for HPGP may be supplied by saturated ammonia separated from the HPGP by an EPDM polymer bladder 48. The saturated ammonia can provide feed pressure to the iN thruster within its nominal operating range over a wide temperature range and provides a reservoir of cold gas for the RCS system. Manifold 88a can connect the HPGP monopropellant rocket engine assembly 44 to the tank 74. Still referring to FIGS. 7A and 7B, the IPPSM 10 can also include propulsion control electronics 52, and microvalve assemblies 50 for thruster valve control and fluid and gas management. According to embodiments, the microvalve assemblies 50 can comprise COTS microvalve assemblies such as the Extended Performance Solenoid Valve (EPSV) from The Lee Company of Westbrook, Conn.

The Applicant is currently developing a line of spacecraft for operation in both Earth orbit and deep space. These spacecraft range from 150-250 kg in size and rely on secondary (rideshare) launch manifest. The mission requirements of near-Earth asteroid exploration may require very large amounts of delta-V (up to 5 km/s). A green monopropellant architecture may be based on flight-proven system such as, for example, HPGP systems developed by ECAPS, a division of the Swedish Space Corporation of Solna, Sweden. An IPPSM as described herein may be central to Applicant's spacecraft design in order to enable greater payload mass fraction at the targeted destination.

Figure 8:
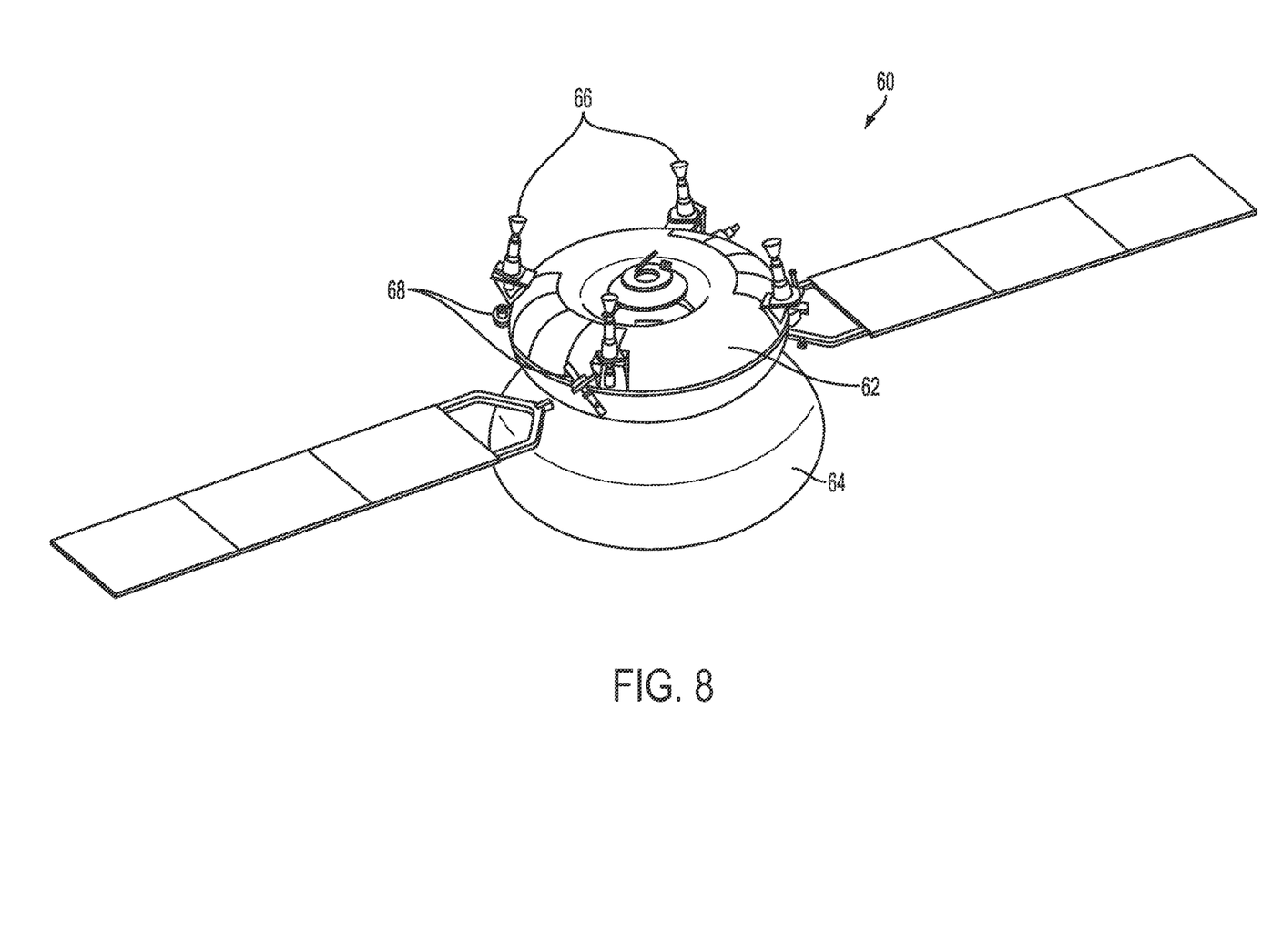
FIG. 8 depicts a perspective view of an embodiment of an asteroid mining spacecraft according to the present invention.

FIG. 8 depicts a perspective view of an embodiment of an asteroid mining spacecraft according to the present invention. As shown, the asteroid mining spacecraft 60 can include a propellant tank 62 and an external tank 64. In addition, the spacecraft 60 can include a plurality of thrusters, such as 22N thrusters 66 and IN thrusters 68, however, other configurations of thrusters are possible.

Embodiments of the IPPSM can be manufactured using additive manufacturing process. As a result, geometries that would have normally existed as separate components, each requiring interface features, can now be in a minimum number of multi-purposed manufactured elements. Pressurant can serve as RCS cold gas and aid in propellant management. The primary structure can serve as launch interface, critical propulsion geometry, and both propellant and pressurant tank.

TABLE 2

IPPSM Performance Summary

| Mass | Units | Value | Impulse | Units | Value |
|---|---|---|---|---|---|
| Total IPPSM Wet Mass | kg | 8.4 | HPGP Specific Impulse | Sec | 235 |
| HPGP Propellant Mass | kg | 4.0 | $NH_3$ Specific Impulse | sec | 90 |
| NH3 Pressurant/ Propellant Mass | kg | 0.4 | HPGP Total Impulse | N * sec | 9221 |
| Expected System Dry Mass | kg | 4.0 | $NH_3$ Total Impulse | N * sec | 353 |

Figure 9:
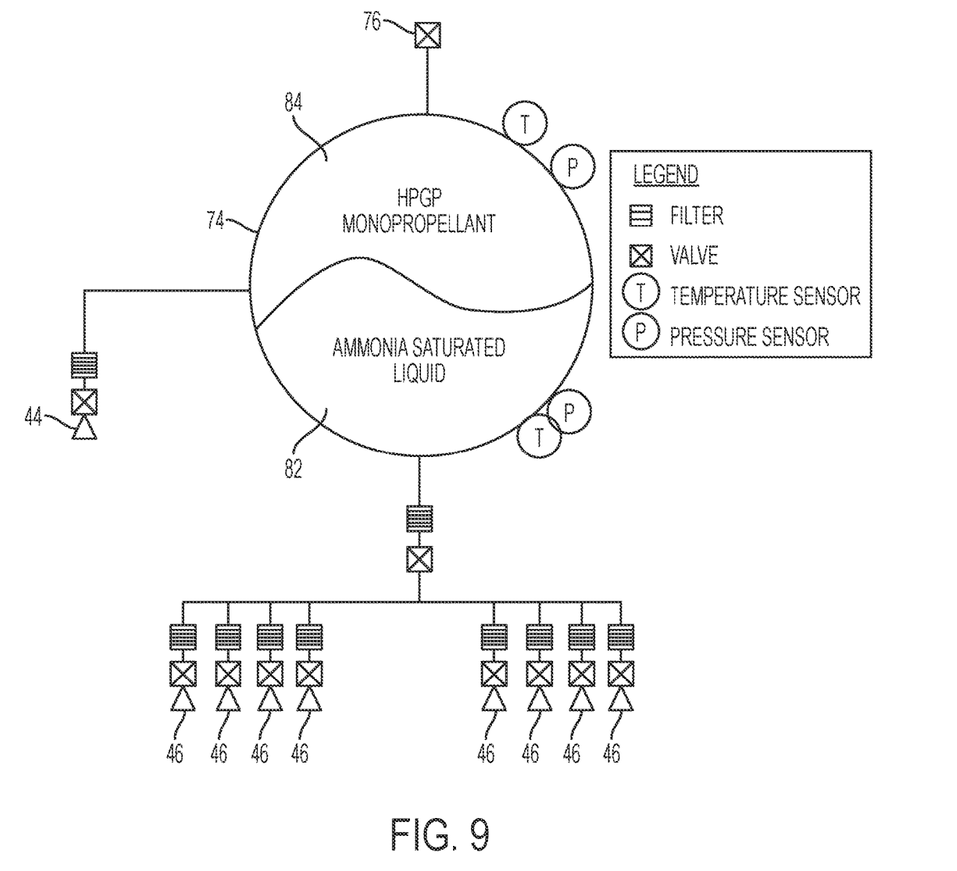
FIG. 9 depicts an example propulsion schematic for the IPPSM of FIGS. 7A and 7B.

Table 2 is a summary of IPPSM mass and impulse capabilities according to the embodiment of FIGS. 7A and 7B, and FIG. 9 is a schematic of an exemplary implementation. When fueled, about 80% (depicted as volume 84) of the available volume may be dedicated to the HPGP monopropellant, corresponding to 3.2 L, 15% (0.6 L) (depicted as volume 82) to liquid ammonia, and 5% (0.2 L) to gaseous ammonia. The HPGP thruster may have nominal operating pressures ranging from about 22 bar to about 5.5 bar, corresponding to saturated ammonia temperatures of about 7° C. to about 52° C.

Referring to FIG. 9, the module can include a plurality of reaction control system (RCS) thrusters 46, located at the corners of the assembly. The thrust chamber, nozzle, and plumbing of each RCS thruster 46 can be formed integrally to the IPPSM component to save assembly complexity. This may be made possible by using additive manufacturing methods. The module can also include a HPGP thruster 44, which can also be formed integrally to the IPPSM. Additionally, the module can include a liquid rocket propellant tank 74 and fill line 76.

Figure 10A:
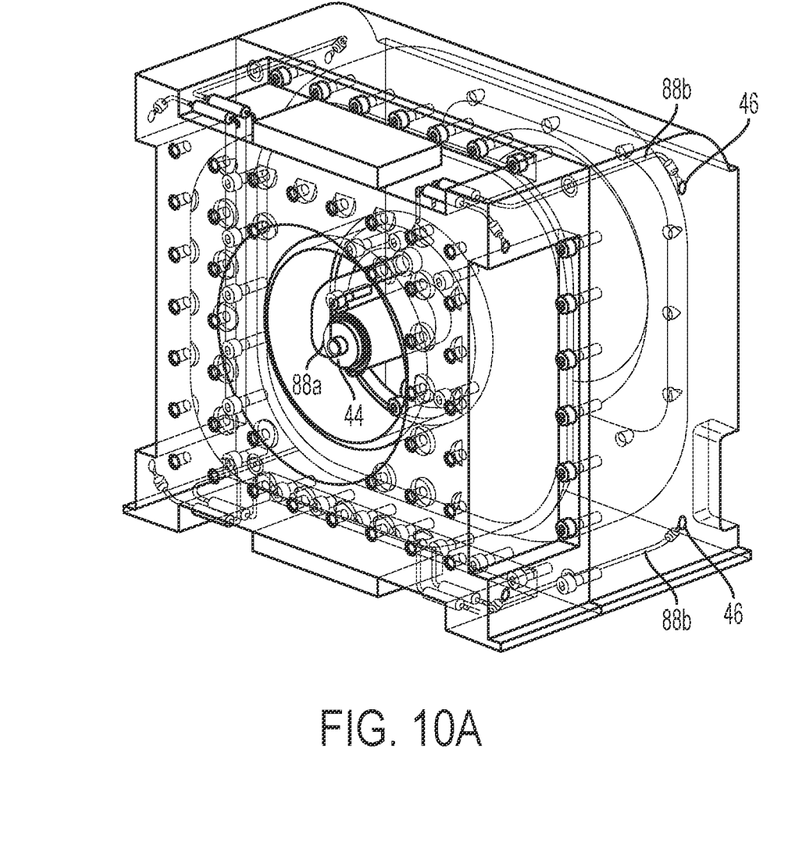
FIG. 10A depicts a side-perspective view of an embodiment of an IPPSM according to the present invention.
Figure 10B:
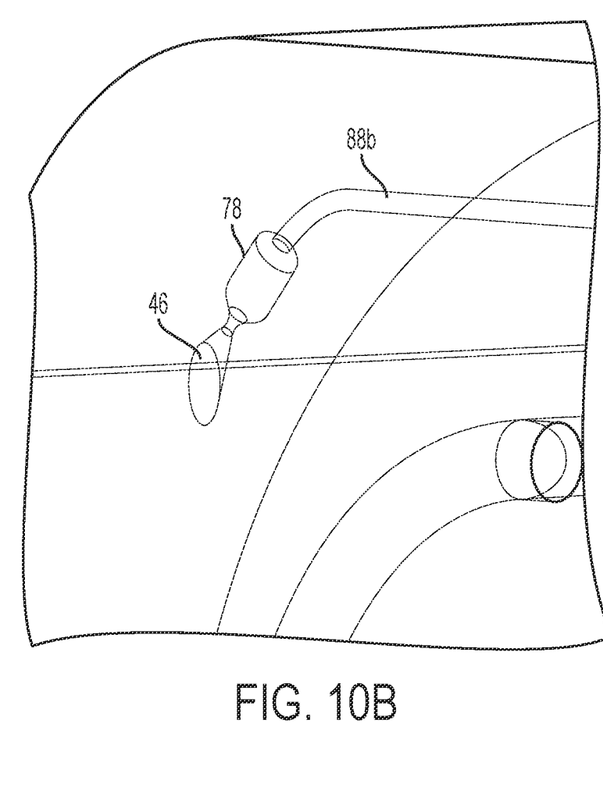
FIG. 10B depicts a partial, enlarged view of a portion of FIG. 10A.

FIG. 10A depicts a side-perspective view of an embodiment of an IPPSM according to the present invention. As seen from FIGS. 10A and 10B, manifold 88b can connect RCS thrusters 46 with the tank. FIG. 10B depicts a partial, enlarged view of a thruster of FIG. 10A. The embodiment of FIGS. 10A and 10B can utilize COTS micro-dispensing solenoid valves 78. When fully integrated, the RCS thrusters may provide 5-DOF control authority to the end user. Each RCS thruster unit may have an estimated thrust level of around 10 mNm and effective impulse bit of 40 μNs, sufficient for fine control of a 12 U CubeSat in the 10-20 kg mass range. The IPPSM may also include a iN HPGP thruster through the center of the module, providing the 6th degree-of-freedom for spacecraft propulsive capabilities. As shown in FIG. 10A, manifold 88a can connect HPGP thruster 44 with the tank. This main engine thruster can give the small satellite the ability to perform significant orbital modification on impulsive timescales.

Figure 11:
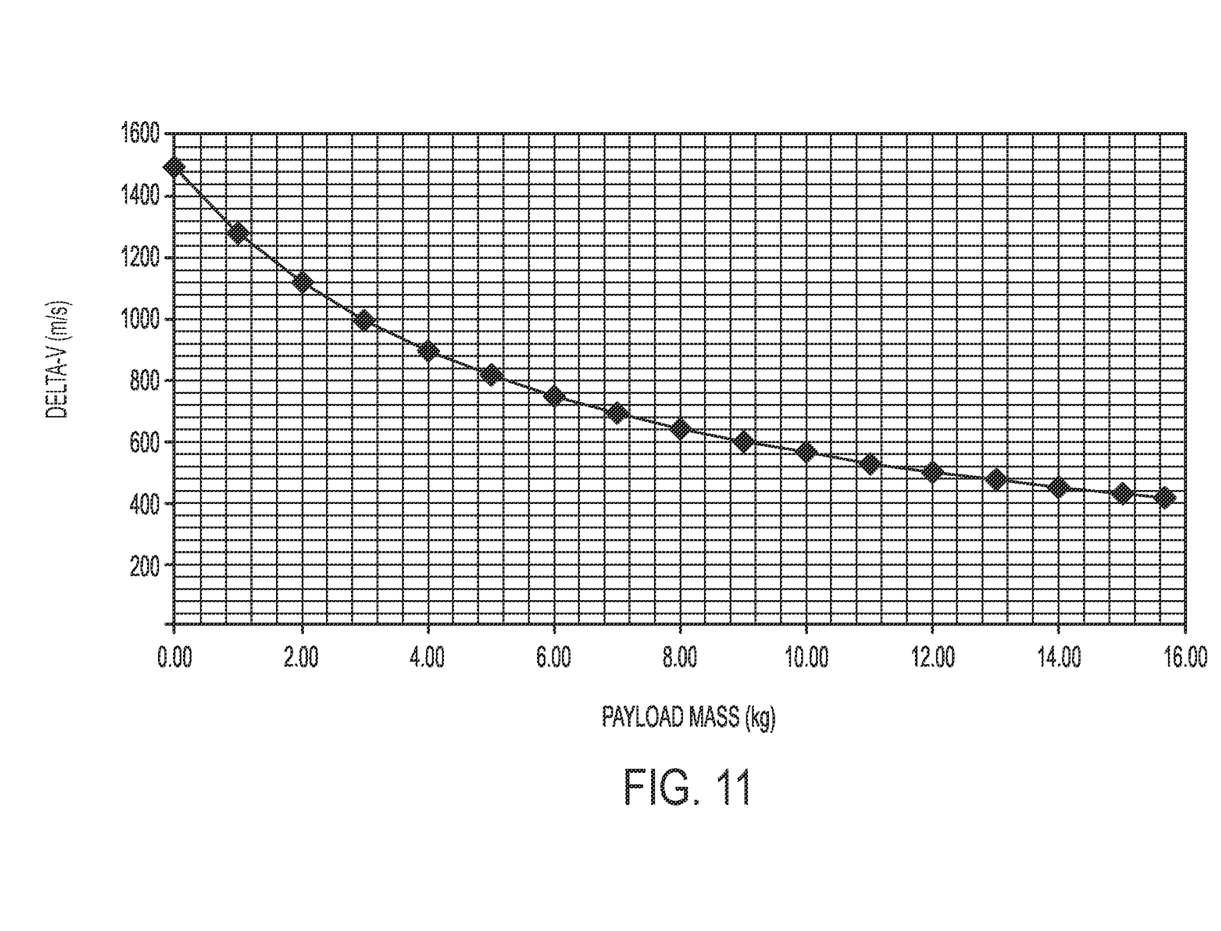
FIG. 11 depicts an example delta-V performance chart for the IPPSM of FIGS. 7A and 7B.

FIG. 11 depicts an example delta-V performance chart for the IPPSM of FIGS. 7A and 7B.

Figure 12A:
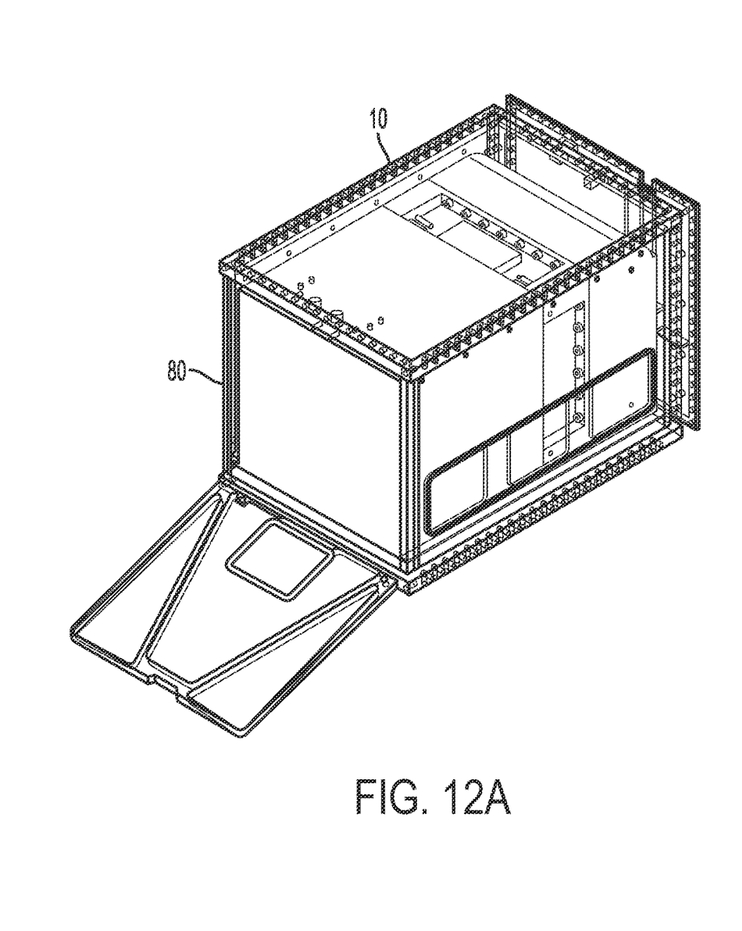
FIGS. 12A and 12B depict perspective views of alternative configurations of IPPSMs according to the present invention.
Figure 12B:
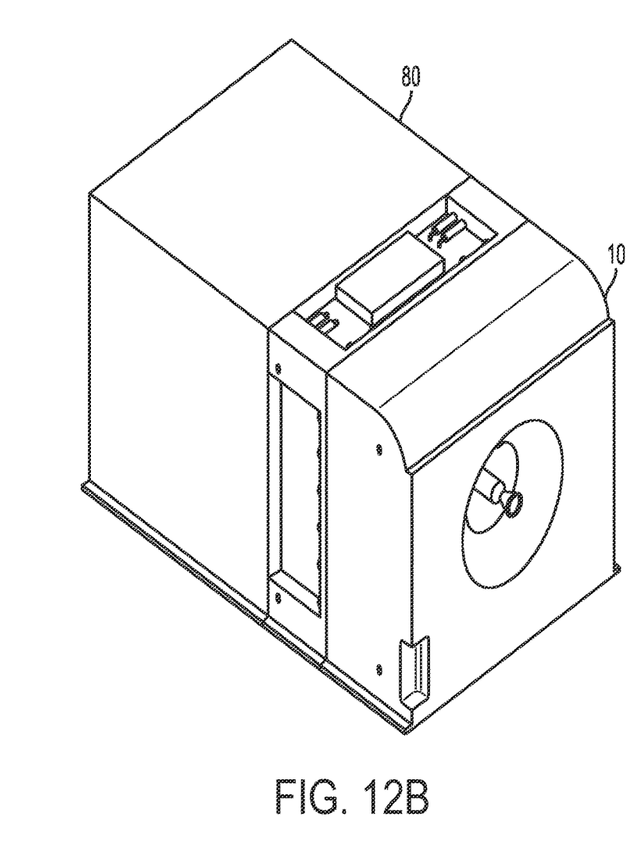

According to embodiments, the ease of module integration and clean physical interface make the IPPSM attractive for a variety of small spacecraft payloads within 12 U size regime. FIGS. 12A and 12B illustrate example configurations of the IPPSM, where a payload 80 has greater than 8 U (202 mm×224 mm×213) at its disposal.

As mentioned previously, embodiments of the IPPSM integrate the needs of the spacecraft's propulsion, primary structure, and launch interface into a single common element. By employing this system, payload and spacecraft developers can focus their efforts towards the optimization of their mission and the successful design, integration, and test of their instruments. The marriage of these disparate spacecraft needs—propulsion, primary structure, and launch interface—may significantly reduce the mass, volume, and cost when compared to the present implementation by means of separate and distinct subsystem components.

Through the use of the additive manufacturing techniques, such as, for example, Direct Metal Laser Sintering (DMLS), or Stereo Lithography investment casting (Quick-Cast™) additive manufacturing techniques, it is possible to fabricate a single primary structural element that contains all of the geometries required to perform the following, usually separate, functions: launch structural interface; spacecraft structural backbone; spacecraft propulsion tank, plenum, and manifold geometries and structures; built-in PCE interface and harness vias; integral valve and thruster assembly locations; and universal flat interface for multiple payload configurations.

Figure 6:
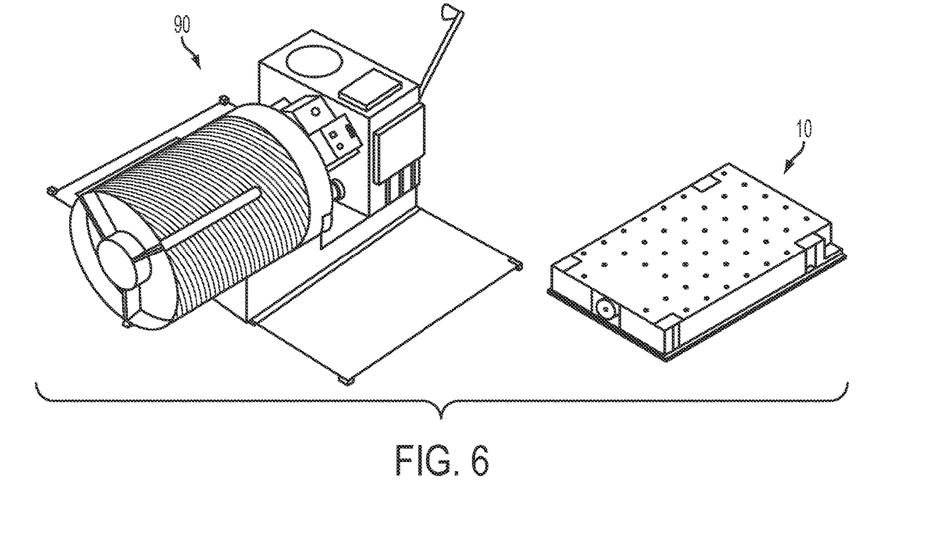
FIG. 6 depicts the IPPSM in combination with a spacecraft.

Applicant is developing a series of spacecraft platforms for operation in Earth orbit and deep space. FIG. 6 depicts an embodiment of the IPPSM 10 in combination with an example of Applicant's Arkyd® series spacecraft 90.

The development of a low-cost, integrated propulsion and structure module for small satellites has the potential to assist in the progress towards the achievement of near-term and long-term scientific and technical goals of NASA and those of other space faring entities. For example, embodiments of the IPPSM can facilitate economical access to space, space debris hazard mitigation (e.g., when used in conjunction with robotic platforms), and new tools of discovery.

Other potential applications of the IPPSM can include low-cost, rapid deployment of LEO/SSO telecommunications constellation as secondary payloads, and deployment of secondary payload imaging constellation.

From the foregoing description, one skilled in the art can readily ascertain the essential characteristics of the invention, and without departing from the spirit and scope thereof, can make changes and modifications of the invention to adapt it to various conditions and to utilize the present invention to its fullest extent. The specific embodiments described here are to be construed as merely illustrative, and not limiting of the scope of the invention in any way whatsoever. Moreover, features described in connection with one embodiment of the invention may be used in conjunction with other embodiments, even if not explicitly stated above. The entire disclosure of all applications, patents, and publications cited above are hereby incorporated by reference in their entirety.

The invention claimed is:

1. A modular device for a spacecraft comprising:
a propulsion system including a tank, a plurality of moving thrusters, a manifold connecting the tank and moving thrusters, and a rocket engine assembly,
wherein the propulsion system is integrally formed with a structural frame of the spacecraft, and
wherein the tank surrounds the rocket engine assembly.

2. The modular device of claim 1, further comprising a payload interface integrally formed with the propulsion system.

3. The modular device of claim 1, wherein the tank has an internal volume of at least about 2000 $cm^3$.

4. The modular device of claim 1, wherein at least some of the moving thrusters comprise a module including at least two valves and at least two thruster nozzles, the module adapted to seal to the propulsion system.

5. The modular device of claim 1, wherein at least some of the moving thrusters comprise reaction control system thrusters.

6. The modular device of claim 1, wherein at least some of the moving thrusters comprise a resistojet maneuvering thruster.

7. The modular device of claim 1, further comprising a plurality of microvalve assemblies adapted to manage gas and fluid in the tank.

8. The modular device of claim 1, wherein the rocket engine assembly comprises a monopropellant rocket engine assembly.

9. The modular device of claim 8, wherein the monopropellant rocket engine assembly comprises a high performance green propulsion monopropellant rocket engine assembly.

10. The modular device of claim 1, further comprising a propulsion control electronics module including power switching elements.

11. The modular device of claim 10, wherein the propulsion control electronics module further includes pressure and temperature monitoring elements.

12. A method of manufacturing the modular device of claim 1, comprising:
utilizing an additive manufacturing process to construct the propulsion system.

13. The method of claim 12, wherein the additive manufacturing process comprises direct metal laser sintering fabrication or stereo lithography investment casting.

* * * * *